US006997067B2

(12) United States Patent
Viot

(10) Patent No.: US 6,997,067 B2
(45) Date of Patent: Feb. 14, 2006

(54) LIQUID SAMPLE PIPETTE WITH DETACHABLE EJECTOR

(75) Inventor: Francois Viot, Auvers-sur-Oise (FR)

(73) Assignee: Gilson S.A.S., Villiers le Bel (FR)

( * ) Notice: Subject to any disclaimer, the term of this patent is extended or adjusted under 35 U.S.C. 154(b) by 0 days.

(21) Appl. No.: 10/240,348

(22) PCT Filed: Apr. 9, 2001

(86) PCT No.: PCT/FR01/01071

§ 371 (c)(1),
(2), (4) Date: Mar. 24, 2003

(87) PCT Pub. No.: WO01/76751

PCT Pub. Date: Oct. 18, 2001

(65) Prior Publication Data

US 2003/0159525 A1 Aug. 28, 2003

(30) Foreign Application Priority Data

Apr. 7, 2000 (FR) .................................. 00 04470

(51) Int. Cl.
*G01N 1/14* (2006.01)

(52) U.S. Cl. .............................. 73/864.14; 73/864.14; 73/864.24; 73/864.25

(58) Field of Classification Search ............. 73/864.14, 73/864.24, 864.25
See application file for complete search history.

(56) References Cited

U.S. PATENT DOCUMENTS 2,986,119 A 5/1961 Roesler et al.
3,497,305 A 2/1970 König
3,604,267 A 9/1971 Johns
3,766,785 A 10/1973 Smernoff
3,882,729 A 5/1975 Roach
3,918,308 A 11/1975 Reed
3,991,617 A 11/1976 d'Autryl
4,009,611 A 3/1977 Koffer et al.
4,151,750 A 5/1979 Suovaniemi et al.
4,164,870 A 8/1979 Scordato et al.
4,263,257 A 4/1981 Metsälä
4,268,481 A 5/1981 Suovaniemi et al.
4,283,950 A 8/1981 Tervamaki
4,369,665 A 1/1983 Citrin
4,442,722 A * 4/1984 Meyer ..................... 73/864.18
RE32,210 E 7/1986 d'Autry
5,073,343 A 12/1991 Hukuhara et al.
5,413,006 A * 5/1995 D'Autry .................. 73/864.18
5,435,197 A 7/1995 Telimaa et al.

(Continued)

FOREIGN PATENT DOCUMENTS

DE 2954504 9/1986

(Continued)

*Primary Examiner*—Hezron Williams
*Assistant Examiner*—André K. Jackson
(74) *Attorney, Agent, or Firm*—Foley & Lardner LLP

(57) ABSTRACT

The sampling pipette comprises a body and an arm movable relative to the body to eject a cone fixed to the pipette, ejection taking place in a longitudinal direction of the pipette, the arm having both a first portion suitable for coming into contact with the cone, and a second portion. The two portions are engaged one in the other and, starting from an operating position, they enable the first portion to be separated from the body by means of an initial movement in a direction that is essentially perpendicular to the longitudinal direction.

14 Claims, 5 Drawing Sheets

U.S. PATENT DOCUMENTS

| | | | | |
|---|---|---|---|---|
| 5,614,153 | A | 3/1997 | Homberg | |
| 5,650,124 | A | 7/1997 | Gilson | |
| 5,696,330 | A | 12/1997 | Heinonen | |
| 5,879,633 | A | 3/1999 | Tervamäki et al. | |
| 5,958,343 | A | 9/1999 | Astle | |
| 5,983,733 | A * | 11/1999 | Strandberg et al. ...... | 73/864.11 |
| 6,295,880 | B1 | 10/2001 | Gilson | |
| 6,532,837 | B1 | 3/2003 | Magussen, Jr. et al. | |
| 6,779,412 | B1 | 8/2004 | Viot | |
| 6,833,114 | B1 | 12/2004 | Christen et al. | |
| 2003/0074988 | A1 | 4/2003 | Suovaniemi et al. | |
| 2003/0074989 | A1 * | 4/2003 | Magnussen et al. ..... | 73/864.14 |
| 2003/0159525 | A1 | 8/2003 | Viot | |

FOREIGN PATENT DOCUMENTS

| | | | |
|---|---|---|---|
| DE | 4339143 | | 5/1995 |
| EP | 0566939 | | 10/1993 |
| EP | 704242 | A2 * | 4/1996 |
| EP | 1268070 | | 11/2003 |
| EP | 1268067 | | 6/2004 |
| FR | 1166673 | | 11/1958 |
| FR | 00 04475 | | 12/2002 |
| GB | 2029723 | | 3/1980 |
| WO | WO 93/11870 | | 6/1993 |
| WO | WO 9604991 | A1 * | 2/1996 |
| WO | WO 01/42759 | | 6/2001 |
| WO | WO 01/76747 | | 10/2001 |
| WO | WO 01/76748 | | 10/2001 |
| WO | WO 01/76750 | | 10/2001 |
| WO | WO 01/76751 | | 10/2001 |
| WO | WO 01/76752 | | 10/2001 |
| WO | WO 01/76753 | | 10/2001 |

* cited by examiner

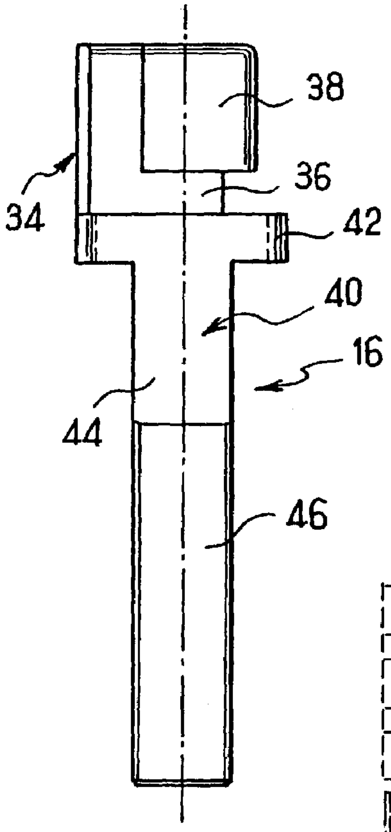
FIG_6
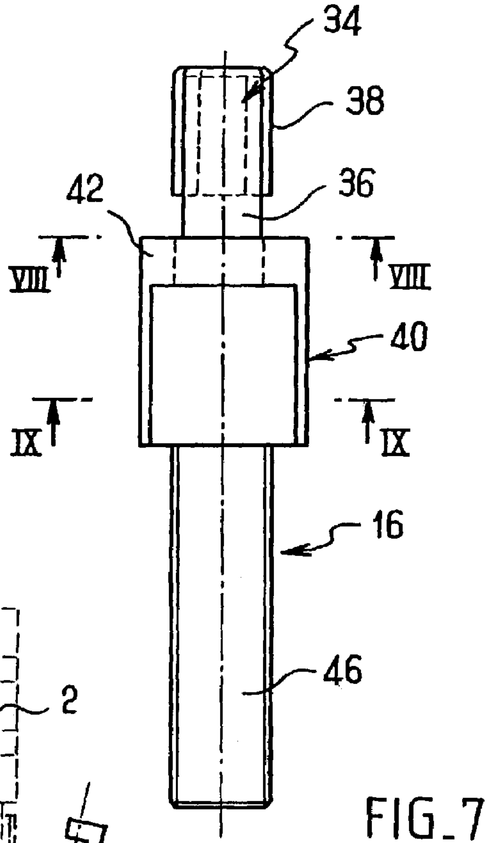
FIG_7
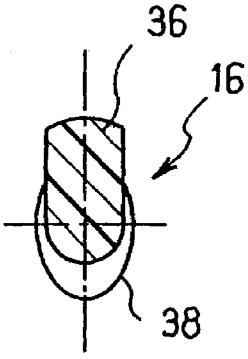
FIG_8
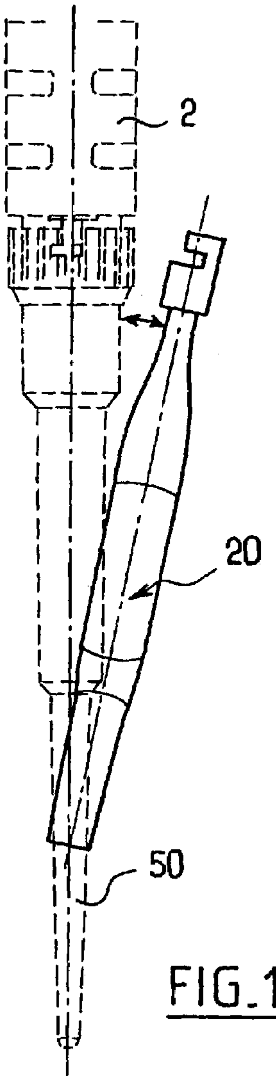
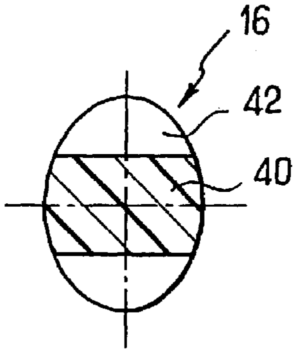
FIG_9
FIG_13

LIQUID SAMPLE PIPETTE WITH DETACHABLE EJECTOR

BACKGROUND OF THE INVENTION

The invention relates to pipettes for taking liquid samples.

A sampling pipette is known, e.g. from document FR-2 696 110, that is suitable for receiving a discardable cone at its bottom end, which cone is held on the pipette by means of friction. The pipette has an ejector that can be actuated by means of a button adjacent to a sampling button. Pressing on that button enables the cone to be pushed away from the pipette when it is desired to replace a used cone with a new cone.

In that pipette, the ejector has an arm with a bottom portion for coming into direct contact with the cone, and a top portion to which the bottom portion is secured by friction engagement in the longitudinal direction of the pipette. This engagement enables the bottom portion of the ejector to be assembled simply and quickly onto the pipette and to be removed with the same advantages. Nevertheless, while ejecting a cone, at the moment when the cone gives way and becomes detached from the tip of the pipette, the ejector follows the cone and its speed increases suddenly. The movement of the ejector is then stopped sharply because the top portion comes into abutment against the body of the pipette. The same braking force is transmitted to the bottom portion via the friction engagement. Unfortunately, this force tends to undo the engagement between the bottom and top portions and to separate them from each other. After ejecting some number of cones, it can thus happen that the bottom portion of the ejector becomes separated from the pipette in untimely manner.

Document WO 96/37302 has a FIG. 19 providing for an ejector in which the bottom portion that pushes against the cone is itself engaged in the longitudinal direction of the pipette in a top portion of the ejector. A fixing tongue holds together the two interconnected portions and prevents them from separating in untimely manner. Nevertheless, in order to remove the bottom portion, it is necessary to reach the tongue, and that is rather awkward.

SUMMARY OF THE INVENTION

An object of the invention is to provide a pipette of a different type that avoids untimely separation of the bottom portion of the ejector, but in which the ejector remains easy to remove.

To achieve this object, the invention provides a sampling pipette comprising a body and an arm movable relative to the body to eject a cone fixed to the pipette, ejection taking place in a longitudinal direction of the pipette, the arm having both a first portion suitable for coming into contact with the cone, and a second portion, wherein the two portions are engaged one in the other and, starting from an operating position, they enable the first portion to be separated from the body by means of an initial movement in a direction that is essentially perpendicular to the longitudinal direction.

Thus, because the arm still comprises two portions that are assembled together, it can continue to be removed in simple manner. Nevertheless, the invention prevents the portions separating in untimely manner under the effect of forces that arise during ejection. In addition, since the friction connection is no longer essential, a connection can be provided that is suitable for being assembled and disassembled without applying force.

The invention may also present at least any one of the following characteristics:

- the pipette is organized in such a manner that the engagement direction is lateral;
- the pipette is organized in such a manner that there is only one engagement direction;
- one of the arm portions is T-shaped, suitable for being received in a correspondingly-shaped housing of the other portion;
- the pipette is organized in such a manner that the two portions can be separated from each other without previously disassembling the pipette;
- the body of the pipette forms an obstacle to separating the two portions, at least when the arm lies at a high end of the ejection stroke;
- the pipette is organized in such a manner that the body enables the two portions to be separated when the arm lies at a low end of the ejection stroke; and
- the pipette includes adjustment means, enabling the length of the arm to be varied continuously over a range of values.

BRIEF DESCRIPTION OF THE INVENTION

Other characteristics and advantages of the invention appear further from the following description of a preferred embodiment given by way of non-limiting example. In the accompanying drawings:

FIGS. 6 and 7 are a rear view and a left-hand view of the connection screw of the FIG. 1 mechanism;

FIGS. 8 and 9 are two cross-section views on planes VIII—VIII and IX—IX of the FIG. 7 screw;

FIG. 13 is a diagram showing how the ejector rod is put into place on the pipette.

DESCRIPTION OF EMBODIMENTS

The sampling pipette constituting the present invention of the invention is of the same type as that described in document FR-2 696 110. Reference should therefore be made to that document for various details of the pipette already disclosed therein. Only certain aspects of the cone ejector mechanism are described in detail below.

Figure 2:
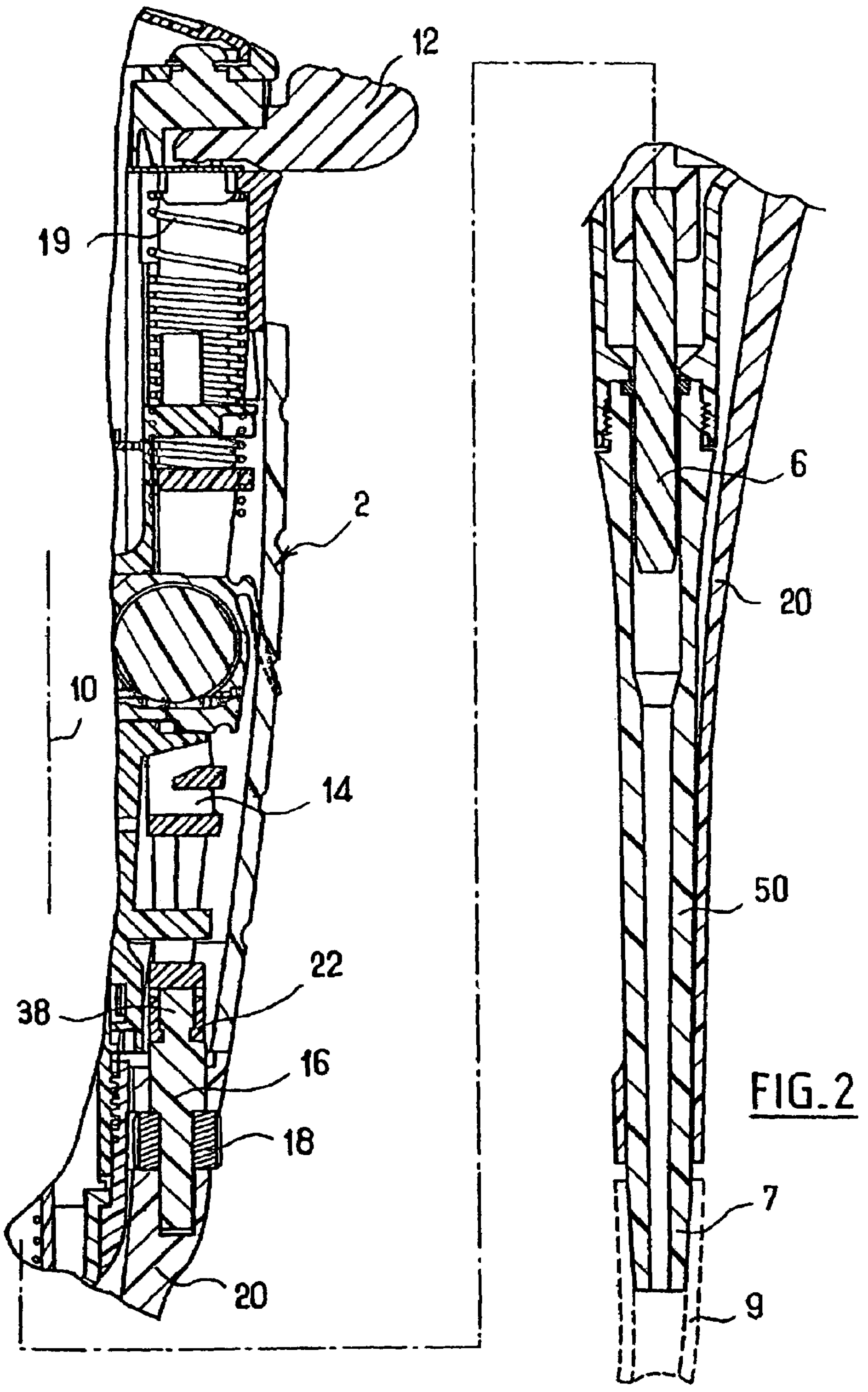
FIG. 2 is a fragmentary axial section view of the pipette showing the location of the FIG. 1 mechanism.
Figure 3:
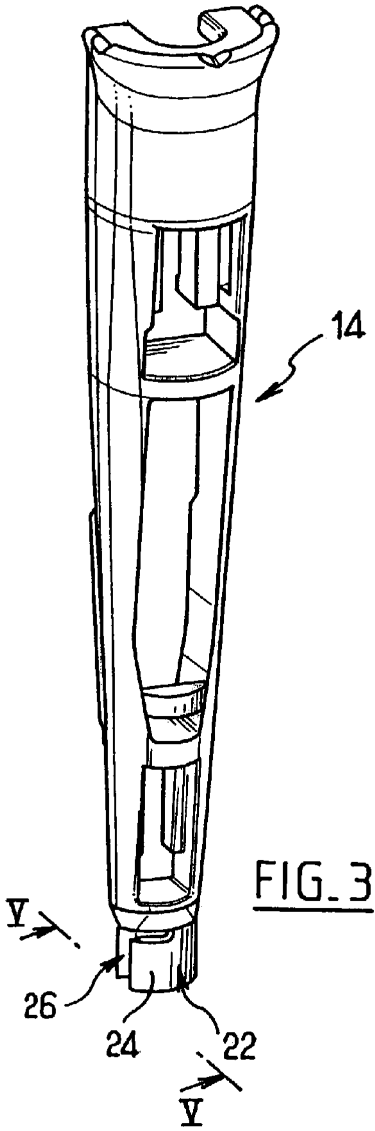
FIGS. 3 and 4 are two perspective views of the actuator of the FIG. 1 device.
Figure 4:
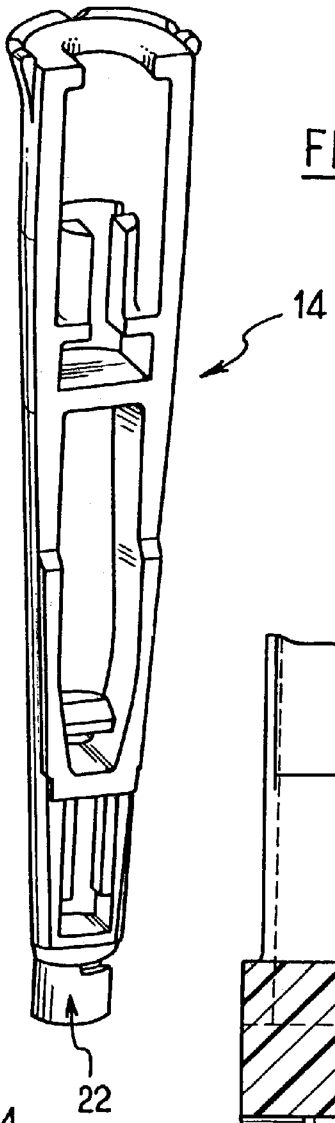
Figure 5:
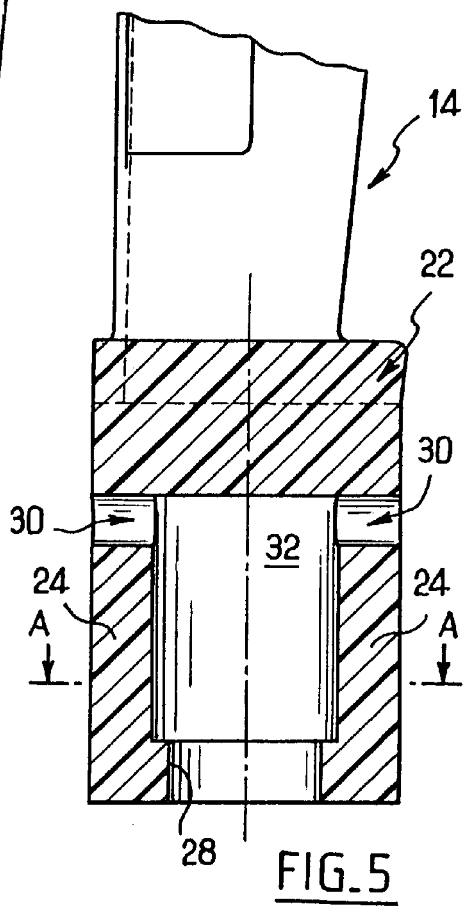
FIG. 5 is a fragmentary axial section view on plane V—V of the FIG. 3 actuator.
Figure 5A:
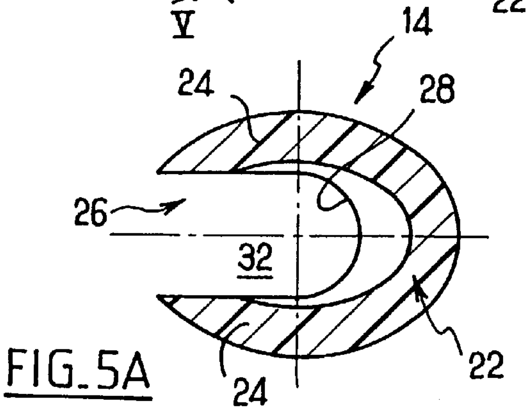
FIG. 5A is an axial section view on plane A—A of the FIG. 5 actuator.

With reference to FIG. 2, the pipette conventionally comprises a body 2 serving as a handle for holding in the user's hand. The pipette has a piston 6 that is slidably movable along a longitudinal axis 10 of the pipette in a bottom cavity of the pipette in order to suck up a volume of liquid that is to be taken into said cavity, or else to expel it therefrom. Displacement of the piston is controlled in particular by means of a control rod on the axis 10 having its bottom portion connected to the piston by parts of known type. At its top end, the rod is surmounted by a pushbutton that is rigidly fixed to the rod and that the user can actuate with the thumb of the hand holding the pipette. The piston thus moves down and up as a function of the same movement of the button. The pipette includes a return spring suitable for returning the piston and the rod to the high position at the end of their down stroke for expelling liquid, and a purge spring whose effect is added to that of the preceding spring when the stroke of the piston is continued downwards for a purge stroke.

The pipette has a bottom tip 7 suitable for receiving a discardable sampling cone 9 in conventional manner, which cone is held by friction acting on the outside of the bottom tip.

Figure 1:
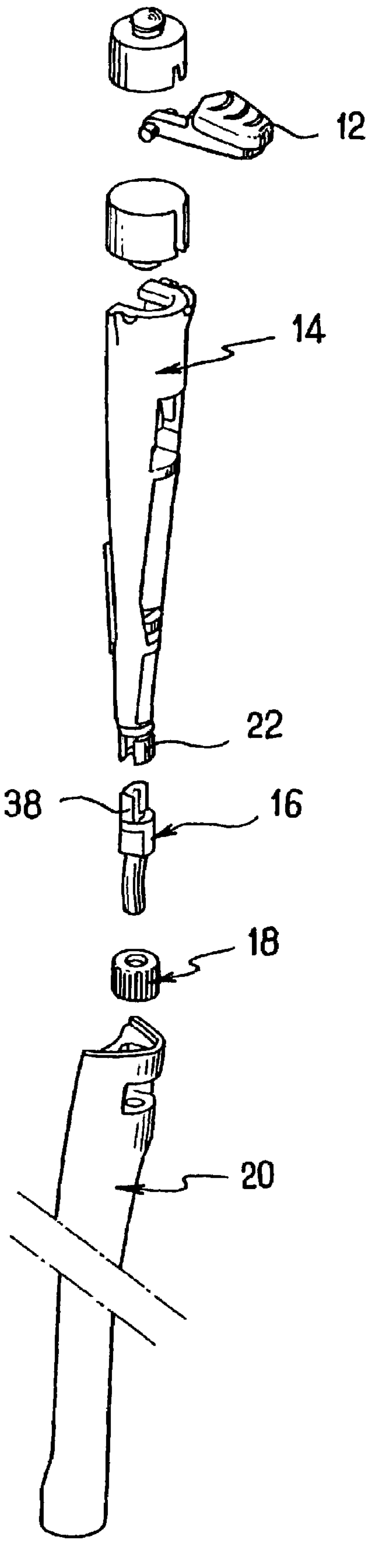
FIG. 1 is a perspective view of the ejector mechanism of a pipette constituting a preferred embodiment of the invention.

The pipette has a cone ejector mechanism as shown in FIGS. 1 and 2. This mechanism comprises, going downwards along the longitudinal direction of the pipette: a control button 12; an actuator 14; a connection screw 16; a knurled wheel 18; and an ejector rod 20. The FIG. 1 ejector mechanism extends over the rear portion of the pipette, i.e. the portion beside the palm of the user's hand.

The actuator 14 is generally elongate in shape in a downward direction and it tapers downwards. It is received in the body 2 of the pipette so as to be slidably movable therein along the axis 10. The pipette is arranged in such a manner that downward pressure on the button 12 causes the actuator 14 to move down. The connection between the button and the actuator can be of conventional type and is not described herein. A return spring 19 shown in FIG. 2 serves to raise the actuator 14 when force is no longer applied to the button 12.

With reference to FIGS. 3, 4, 5, and 5A, the actuator 14 presents a bottom end formed by a female coupling portion 22. This portion is shaped in a direction parallel to the axis 10 and has a generally U-shaped cross-section, and more precisely a cross-section in the form of a portion of an ellipse with both limbs 24 of the U-shape extending towards each other at both ends. The opening 26 of the U-shape faces sideways, in this case towards the left-hand side of the pipette. The bottom edge of the coupling portion 22 has a shoulder forming a step 28 projecting radially towards the inside of the U-shape. Nevertheless, this shoulder is also U-shaped. Each limb 24 is separated from the remainder of the actuator by a horizontal notch 30 extending from a point situated about halfway along the length of the branch to the free end thereof. The coupling portion forms a cavity 32 between the limbs 24.

With reference to FIGS. 6 to 9, the connection screw 16 has a top head 34. The head 34 includes a support 36 generally in the form of a rectangular parallelepiped and a male coupling portion 38 suitable for penetrating into the female coupling portion 22 of the actuator. For this purpose, the male coupling portion 38 is of constant section parallel to the axis 10, while transversely to said axis it is generally of elliptical shape. The connection screw 16 has a core 40 from which the support 36 projects upwards, being offset laterally relative thereto. The height of the male portion 38 is less than the height of the support 36. The top ends of the male portion 38 and of the support 36 are at the same level, but the male portion lies at a distance from the core 40 so as to enable the step 28 to pass between them. The male portion 38 extends towards the right, projecting from the support 36, and also towards the front and towards the rear. Seen from the left and from the right it presents a T-shaped profile.

The male portion 38 is suitable for being received by being engaged in the female portion 22 in a lateral direction perpendicular to the axis 10. During insertion, the limbs 24 spread apart and then move back towards each other, thereby producing a click indicating that the male portion has reached its reception position. The limbs are capable of bending because of the notches 30 and because of the material used, which in this case is a thermoplastic material. The step 28 takes up position between the male portion 38 and the core 40. The connection screw 16 is thus rigidly assembled to the actuator 14. This assembly can be disassembled. Assembly and disassembly are performed by moving the screw in translation relative to the actuator in a left-right lateral direction.

The core 40 of the connection screw has a flat top plate 42 and a thin bottom portion 44 of essentially rectangular section. At its bottom end it is extended by a threaded rod 46.

Figure 10:
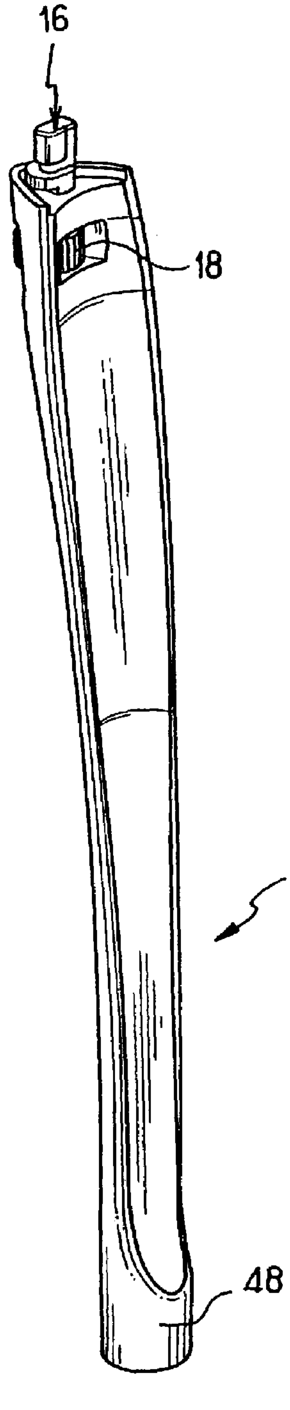
FIGS. 10 and 11 are a perspective view and an axial section view of the ejector rod of the FIG. 1 mechanism.
Figure 12:
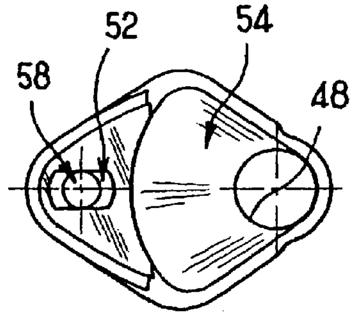
FIG. 12 is a plan view of the FIG. 10 ejector rod.
Figure 11:
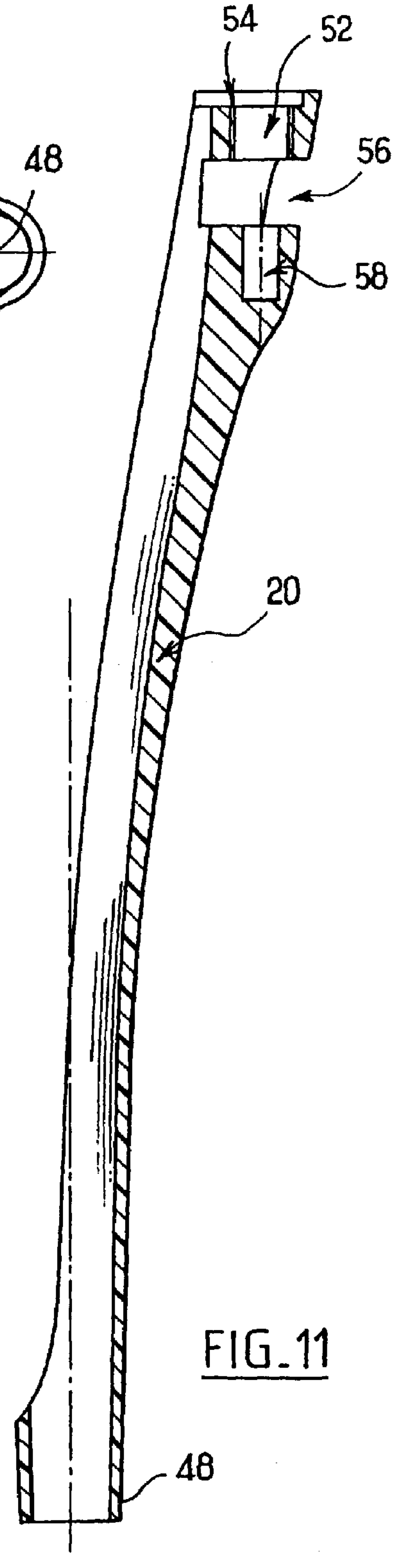

With reference to FIGS. 10 to 12, the ejector rod 20 is elongate in shape in the vertical direction. Its transverse section is essentially hollow and open. Nevertheless, this section is closed at the bottom end 48 of the rod in order to form a ring that is engaged slidably on a bottom endpiece 50 of the body 2 forming its bottom end 7, as shown in FIG. 2. The ring is suitable for coming directly into contact with the cone in order to eject it. In addition, the rod 20 is essentially non-rectilinear in shape so as to unite said bottom end 48 lying on the axis 10 of the pipette with the rear portion of the pipette at the top end of the rod which is off-center relative to the axis 10.

At its top end, the rod presents a top vertical duct 52 of rectangular cross section extending from a top face 54 of the rod to a notch 56 cut horizontally into the rod from its rear face and going towards its front face. Beneath the notch, the rod has a bottom duct 58 coaxial with the top duct 52, but this time of circular cross section. The diameter of the bottom duct 58 is equal to the width of the profile of the top duct 52, and likewise the diameter of the threaded rod 46 of the screw 16 is equal to the width of the bottom portion 44 of the support.

The knurled wheel 18 has a central threaded duct to form a screw-and-nut connection with the rod 46 of the screw 16.

The wheel 18 is received in the notch 56 in alignment with the ducts 52 and 58. The screw 16 penetrates into both ducts and also into the wheel. The male portion 38 projects from the top face 54, with the rectangular portion 44 of the support being received in the top duct 52, thereby preventing the rod 20 from turning relative to the screw while allowing them to slide relative to each other. The wheel 18 forms a screw-and-nut connection with the rod 46 of the screw. The bottom portion of the screw is slidably received in the bottom duct 58. The rod 20 is thus connected to the pipette firstly by the connection screw 16 and secondly by the ring 48 engaged on the endpiece.

The wheel 18 is directly accessible to the user from behind the pipette through the notch. Turning the wheel causes the rod 20 to slide up or down relative to the body 2 parallel to the axis 10, thereby adjusting its position as a function of the type of discardable cone used.

In order to eject a cone, the button 12 is lowered so as to bring the rod 20 to the bottom end of its stroke, thereby pushing the cone downwards and detaching it from the pipette.

When the ejector mechanism is at rest, i.e. at the top end of its stroke, the male and females portions 38 and 22 are received inside the body of the pipette and they are inaccessible to the user. In addition, they are protected therein against impacts and against dirt. The rod 20 cannot be removed while in this position.

In order to remove the rod 20 and separate it from the pipette, the button 12 is lowered so as to place the rod in its bottom end of stroke position. The male and female portions are then visible. The rod 20 is then pushed sideways to separate the male and female portions as described above and as shown in FIG. 13. This causes the rod 20 to tilt relative to the body of the pipette, with such tilting being possible because of clearance at the ring 48. The bottom portion of the rod is then slid downwards so as to disengage it from the pipette. Reassembly is performed by following the same operations in reverse order. The rod 20 can be assembled and removed without applying force, unlike the longitudinal connection obtained by friction in the prior art.

It can thus be seen that the rod 20, the knurled wheel 18, and the screw 16 constitute a first portion of the ejector arm suitable for being engaged laterally in the second portion of the arm as formed by the actuator.

It should be observed that the rod can also be removed under such circumstances by turning the wheel until it becomes disengaged from the connection screw 16. However that would separate the rod 20, the screw 16, and the knurled wheel 18 from one another, whereas the procedure described above keeps these three parts connected together.

Because of the step 28, the rod 20 cannot be separated from the actuator 14 by sliding parallel to the axis 10. It is necessary to begin by imparting relative movement in a lateral direction. There is thus no likelihood of untimely separation occurring while ejecting a cone.

The knurled wheel 18 serves to adjust the length of the ejector arm constituted by the actuator 14 and the rod 20 over a known range of length values.

Naturally, numerous modifications could be applied to the invention without going beyond the ambit thereof.

For example, the rod 20 could be connected to the actuator 14 by connections of other types that impede relative sliding between these parts of the ejector, for example one or more screw-and-nut connections or a bayonet type connection.

The characteristics enabling the length of the arm to be adjusted over a known range of values can be implemented independently of the characteristics relating to the arm being made up of two portions that are engaged one in the other and that can be separated in a direction that is perpendicular to the longitudinal direction.

What is claimed is:

1. A sampling pipette comprising:

(a) a body; and (b) an ejector arm attached to the body, the ejector arm comprising an ejector rod and an actuator connected to the ejector rod, wherein the ejector rod and the actuator are engaged one in the other such that the ejector rod and the actuator may be separated by moving the ejector rod sideways with respect to the actuator, further wherein the ejector rod can be separated from the actuator without removing the actuator from the body, and further wherein the ejector rod can be separated from the actuator only when the ejector rod is at the bottom end of a purge stroke.

2. The sampling pipette of claim 1, wherein the ejector rod and the actuator can be assembled in only one direction.

3. The sampling pipette of claim 1, wherein the connection between the actuator and the ejector rod comprises a connection screw.

4. The sampling pipette of claim 3, wherein the ejector rod comprises a vertical duct for housing the connection screw.

5. The sampling pipette of claim 4, wherein the ejector rod further comprises a ring capable of slidable engagement with an endpiece of the body.

6. The sampling pipette of claim 1, wherein the connection between the ejector rod and the actuator comprises a male-female connection.

7. The sampling pipette of claim 1, wherein the connection between the ejector rod and the actuator comprises a bayonet-type connection.

8. A sampling pipette comprising:

(a) a body;

(b) an ejector arm attached to the body, the ejector arm comprising an ejector rod and an actuator engaged one in the other through a connection, wherein the connection comprises a sideways facing generally U-shaped portion and a male portion adapted to be received in a lateral direction by the generally U-shaped portion, and further wherein the generally U-shaped portion comprises a bottom edge comprising shoulder forming a step projecting radially from the inside of the U-shape.

9. The sampling pipette of claim 8, wherein the male portion is disposed on a T-shaped connection screw.

10. The sampling pipette of claim 9, wherein a support connects the T-shaped connection screw and the male portion.

11. The sampling pipette of claim 10, wherein the T-shaped connection screw comprises a core and a threaded rod.

12. The sampling pipette of claim 11, wherein the threaded rod is screwed into an opening in the ejector rod.

13. The sampling pipette of claim 8, wherein the generally U-shaped portion comprises limbs that spread apart to accept the male portion.

14. The sampling pipette of claim 8, wherein the generally U-shaped portion and the male portion are constructed from thermoplastic material.

* * * * *